Oct. 18, 1960 F. H. HIGHLEY 2,956,815
MEANS FOR REDUCING LANDING GEAR VIBRATION
Filed June 20, 1958

INVENTOR.
FRANK H. HIGHLEY
BY
ATTORNEY

2,956,815

MEANS FOR REDUCING LANDING GEAR VIBRATION

Frank H. Highley, Canton, Ohio, assignor to The Goodyear Tire & Rubber Company, Akron, Ohio, a corporation of Ohio Filed June 20, 1958, Ser. No. 743,446

1 Claim. (Cl. 280—124)

This invention relates to means for reducing vibration in the landing gears of aircraft and is especially useful in damping linear vibration of such a landing gear.

It is an object of the present invention to reduce linear vibration of the landing gear by damping torsional vibration of the wheel.

A further object is to reduce such linear vibration of the landing gear by use of an annular member having high inertia and floatingly supported by a landing wheel.

These and other objects will appear from the following description and the accompanying drawings.

Figure 1:
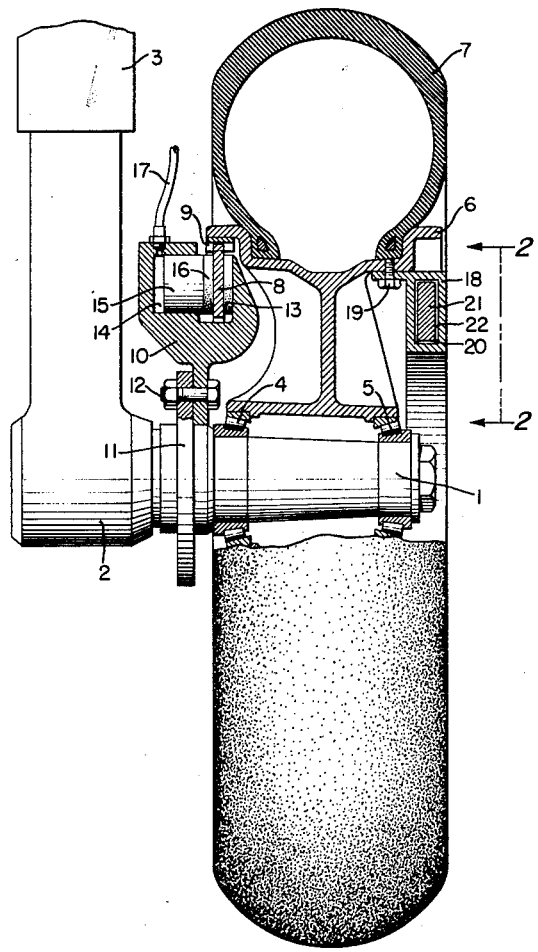
Fig. 1 is a vertical view, partially in section of an aircraft landing wheel and a portion of its supporting oleo strut, the section being taken in the vertical plane of the axis of the wheel.

Referring to the drawings, the numeral 1 designates a stub axle non-rotatably secured to the lower portion 2 of a telescopic strut 3. The axle carries bearings 4, 5 for rotatably supporting a landing wheel 6 on which a tire 7 is mounted. A brake disc 8 is carried by the wheel and is driven thereby, keys 9 being provided on the rim of the wheel for entering driving notches in the periphery of the disc whereby the disc may float axially but rotates with the wheel.

A support 10 is secured to a flange 11 of the axle, as by bolts 12. It is formed with a C-shaped portion one leg of which carries a brake lining pad 13 for engaging one face of the brake disc. The opposite leg of the support is formed with a fluid pressure cylinder 14 in which a piston 15 is fitted. A brake lining 16 is mounted on the piston adjacent the opposite side of the brake disc. A flexible pipe connection 17 supplies operating fluid pressure to the cylinder from a valve operated by the pilot.

In landing the aircraft, touch-down is accomplished with the brakes released and the landing wheels free running. Telescoping of the strut members takes place to cushion the landing. The brake is then applied and linear vibration may occur either in a direction longitudinal of the strut or in the direction of landing of the aircraft and normal to the axis of the strut.

To reduce linear vibrations an annular body 18 is secured concentric to the wheel as by screws 19. It is formed with a closed annular cavity 20 concentric with the wheel. Within the cavity and substantially filling it is a ring 21 having high inertia. The ring is surrounded by and spaced from the walls of the cavity 20 by a damping fluid 22, such as a silicone oil having constant viscosity properties. The radial and axial clearance between the walls of the cavity 20 and the ring 21 and the thickness of the film of damping fluid 22 is relatively small so that centering of the ring in the cavity is effected.

It will be understood that there can be no linear vibrations of the landing gear strut without accompanying torsional vibration of the wheel. Because of this relationship of torsional and linear vibration it is possible to effect linear damping of the landing gear strut by means effecting torsional damping of the wheel. More specifically, the ring 21 tends to rotate at a constant velocity, but under any condition of linear vibration of the strut the wheel tends to change its angular velocity. Any relative rotation between the ring 21 and the cavity 20 is resisted by the damping action of the fluid 22. The resultant torsional vibration damping on the wheel, for reasons aforesaid, produces linear damping action on the strut.

Figure 2:
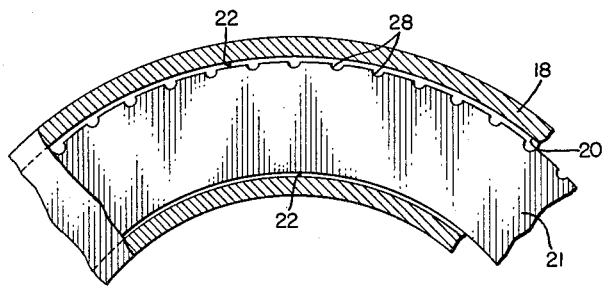
Fig. 2 is a sectional view taken on line 3—3 of Fig. 1.

The ring 21 and the annular cavity in which it is confined may have smooth faces or one or both may be formed with grooves, as for example the peripheral axial grooves 28 of Fig. 2, to provide greater resistance to relative rotation.

Figure 3:
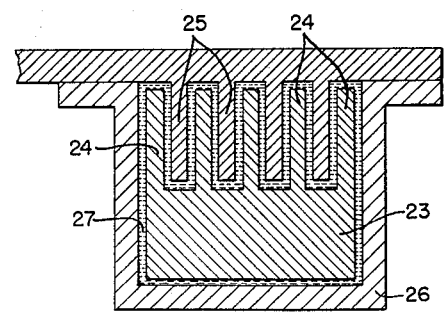
Fig. 3 is a cross-sectional view of a modification of the invention.

In the modification shown in Fig. 3, the floating ring 23 is formed with a plurality of axially-spaced, circumferentially extending fins 24 interposed between similar fins 25 formed on the annular body 26. Damping fluid 27 fills the space between the parts. In this embodiment of the invention the greater area of surface between the parts enhances the damping action.

Thus it will be seen that the objects of the invention have been accomplished in that torsional damping means have been provided for damping out linear vibration of the landing gear.

While certain representative embodiments and details have been shown for the purpose of illustrating the invention, it will be apparent to those skilled in this art that various changes and modifications may be made therein without departing from the spirit or scope of the invention.

What is claimed is:

In combination, an airplane wheel strut having upper and lower portions telescopically fitted for relative movement, a rotatable landing wheel mounted on the lower strut portion, said wheel having a rim channel and a pneumatic tire mounted thereon, an annular casing concentric with and fixed against movement relative to the wheel adjacent the rim channel, a closed annular channel concentric with the wheel provided in the casing, damping fluid in said channel, and an annular inertia member concentric with said wheel and confined in said channel separated therefrom by said fluid for damping linear vibration.

References Cited in the file of this patent

UNITED STATES PATENTS

| 2,438,011 | Knox | Mar. 16, 1948 |
| 2,724,983 | O'Connor | Nov. 29, 1955 |
| 2,775,317 | Sinisterra | Dec. 25, 1956 |
| 2,854,100 | Bowser | Sept. 30, 1958 |